Aug. 20, 1929.    J. I. JOBE    1,725,713
PIPE COUPLING
Filed July 11, 1927
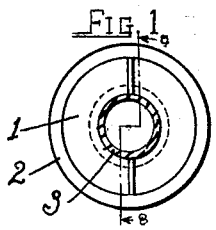
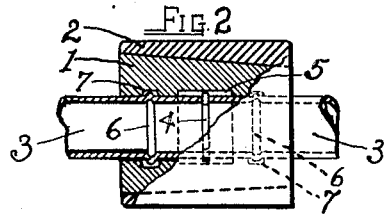
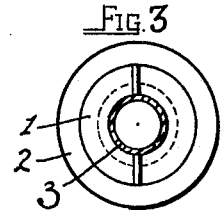
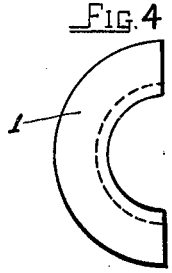
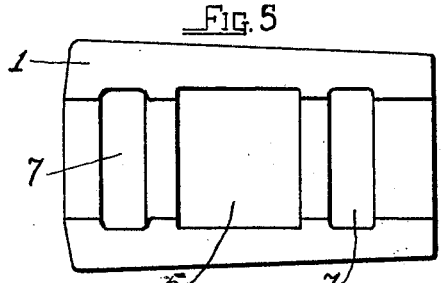
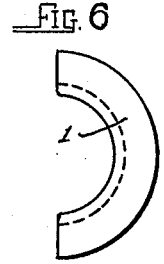
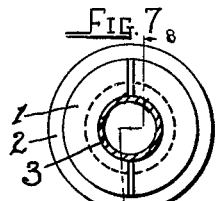
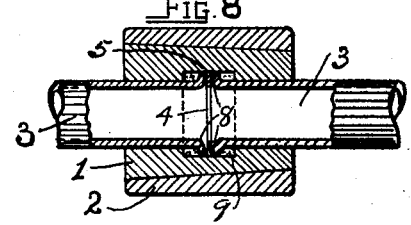
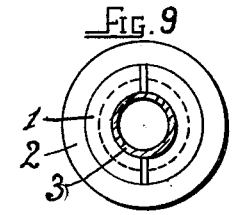
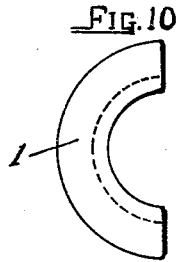
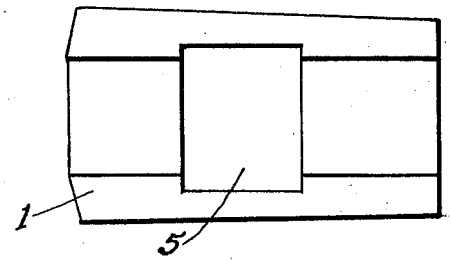
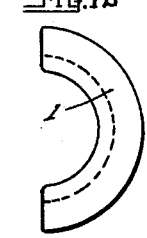
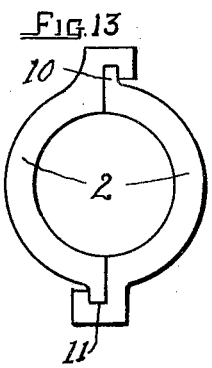
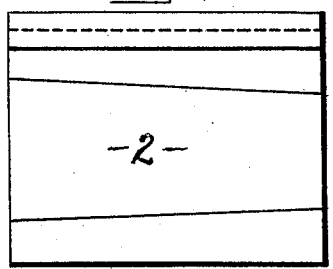
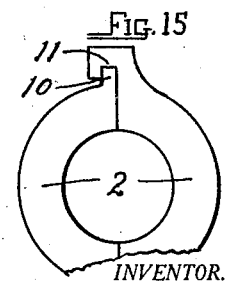
INVENTOR.
JAMES I. JOBE
BY
U. G. Charles
ATTORNEY.

Patented Aug. 20, 1929.

UNITED STATES PATENT OFFICE.

1,725,713

JAMES I. JOBE, OF TOPEKA, KANSAS, ASSIGNOR OF ONE-HALF TO CHARLES THOMPSON AND JOHN A. SWENSON, BOTH OF WHITE CITY, KANSAS.

PIPE COUPLING.

Application filed July 11, 1927. Serial No. 204,884.

My invention relates to a pipe coupling.

The object of my invention is to avoid the use of threaded members.

A further object of my invention is to provide a coupling that may be applied to the pipe line without severing the line.

A still further object of my invention is to provide a coupling mechanism that will repair a leak in the pipe line.

A still further object of my invention is to provide a coupling mechanism that can be quickly applied.

These and other objects will be hereinafter more fully explained.

Referring to the drawings:

Fig. 1 is an end view of one type of the coupling assembled.

Fig. 2 is a side view partly in section.

Fig. 3 is an opposite end view of Fig. 1.

Fig. 4 is an end view of one of the bushing halves.

Fig. 5 is an inside view of Fig. 4.

Fig. 6 is an opposite end view of Fig. 4.

Fig. 7 is an end view of another type of the coupling.

Fig. 8 is a sectional view taken on line 8—8 in Fig. 7.

Fig. 9 is an opposite end view of Fig. 7.

Fig. 10 is an end view of another type of the bushing half.

Fig. 11 is an inside view.

Fig. 12 is an opposite end view of Fig. 10.

Fig. 13 is an end view of a modified sleeve.

Fig. 14 is an inside view.

Fig. 15 is an opposite end view of Fig. 13.

In the drawings like characters will apply to like parts throughout the specification.

The mechanism herein disclosed consists of a bushing 1, which is made in two parts, diametrically divided and being tapered on the outside as shown in Fig. 2, over which will engage a sleeve 2, the said sleeve having a like taper for the bore thereof, so that as being driven the bushing halves will be contracted to tight engagement on the pipe 3, said pipe having a joint centrally positioned to the bushings, at which point a gasket 4 may be placed and the outer periphery thereof will engage snugly in a recess 5 which extends around the interior of the bushing heads.

As a further means to prevent separation of the pipes, and outward protrusion 6 is rolled near the end of the pipes, the said protrusion adapted to engage in a recess or groove 7, one of said grooves being near each end of the bushing members, as shown in Fig. 2.

Figs. 4, 5, and 6 are enlarged details of the above described bushing to more clearly show the form of the interior and the taper of the exterior.

In Figs. 7, 8, and 9 is shown a modification for the interior of the bushing, and also a proposed flaring of the ends of the pipe.

In last said bushing the recess 5 alone is employed to secure the ends of the pipe snugly together, the ends of said pipe being flared as at 8 to engage near the peripheral wall of the recess; between the ends of the pipe is placed a gasket 4, similar to that described and shown in Fig. 2, and in addition thereto to secure a tight sealing of the joint, packing 9 is placed between the flaring ends of the pipes and the side walls of the recess as shown in Fig. 8. The said packing and washer may be fabric, lead, or such other material as will be appropriate to seat the joint against the pipe contents, whether it be gas or fluids, the last described pipe sealing means will also function as retaining means to prevent separation of the ends of the pipes.

There are times when a pipe line will become fractured or defective; to repair such, the bushing halves may be applied with proper packing and under this condition I have provided a separable sleeve as shown in Figs. 13, 14, and 15, the said sleeve members being arcuated and having a tongue 10 on one side and a groove 11 on the other side thereof, so that the members are interchangeable, being made from one pattern.

It is now readily seen how the halves of the said sleeves may be placed on the pipe and slid longitudinally until the ends are even, the bore thereof being tapered to conform to a like taper, on the bushing member is means that when driven on said bushing the halves thereof will contract, thus sealing securely the defect in the pipe. It will also be understood that this style of sleeve may be employed when joints in the pipe are being connected as heretofore described.

While I have not shown in the drawing that pipes of different diameter may be connected, it will be understood that the larger end of the bushing may be bored to receive the larger pipe, or such other modifications may be employed without departing from the principles of my coupling means, which is accomplished at all times by driving the bushing longitudinally on the sleeve members and where the sleeve members joint diametrically the edges thereof shall be removed at the contact points to allow the construction on the pipe without contacting as the sleeve is driven to proper engagement.

It is now seen how readily the coupling may be removed, which is accomplished by driving the sleeve in the opposite direction from that when assembling the same to engagement.

Having fully described my invention, what I claim as new and desire to secure by Letters Patent is:

In a pipe coupling, in combination with joined pipes having each of the adjacent ends turned outward, and a gasket placed between the turned portions, a bushing diametrically divided and being recessed on the interior to receive the outwardly turned ends of the pipes and the gasket placed between the turned portions of the ends, the bushing members being uniformly tapered on the exterior, a sleeve diametrically divided and having a tapered bore to conform to the taper of the bushing and equal to or slightly smaller in diameter to that of the bushing so that when the sleeve is driven to full length engagement with the bushing the said bushing will bind firmly to the pipes, a tongue on one side of each sleeve member and extending in the same plane with the diametrical joint, and a groove on the opposite side of each of the sleeve members to receive each of the said tongues respectively, by which means the sleeve members are interchangeable and capable of being assembled at any intermediate point along the pipe line.

In testimony whereof I affix my signature.

JAMES I. JOBE.